United States Patent
Hornung et al.

(10) Patent No.: US 10,606,693 B2
(45) Date of Patent: Mar. 31, 2020

(54) MEMORY CONTROLLER IMPLEMENTED ERROR CORRECTION CODE MEMORY

(71) Applicant: Micron Technology, Inc., Boise, ID (US)

(72) Inventors: Bryan Hornung, Plano, TX (US); Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 151 days.

(21) Appl. No.: 15/856,910

(22) Filed: Dec. 28, 2017

(65) Prior Publication Data
US 2019/0205206 A1 Jul. 4, 2019

(51) Int. Cl.
G06F 11/00 (2006.01)
G06F 11/10 (2006.01)

(52) U.S. Cl.
CPC ........ G06F 11/1016 (2013.01); G06F 11/108 (2013.01)

(58) Field of Classification Search
CPC .................................................. G06F 11/1016
USPC ........................................................ 714/6.21
See application file for complete search history.

(56) References Cited

U.S. PATENT DOCUMENTS

| | | | |
|---|---|---|---|
| 7,230,986 B2* | 6/2007 | Wise | G06F 9/3867 375/240.26 |
| 2002/0069317 A1* | 6/2002 | Chow | G06F 3/0611 711/104 |
| 2015/0186198 A1* | 7/2015 | Dong | G06F 11/076 714/706 |

OTHER PUBLICATIONS

Wikipedia "ECC Memory" page, retrieved from https://en.wikipedia.org/wiki/ECC_memory (Year: 2019).*
Wikipedia "Chipkill" page, retrieved from https://en.wikipedia.org/wiki/Chipkill (Year: 2019).*

* cited by examiner

*Primary Examiner* — Yair Leibovich
(74) *Attorney, Agent, or Firm* — Schwegman Lundberg & Woessner, P.A.

(57) ABSTRACT

Devices and techniques for memory controller implemented error correction code (ECC) memory are disclosed herein. ECC groups may be placed across banks of the memory. In some examples, an ECC group is a collection of bytes equal to one row in one bank. Also, the placement may restrict a given bank to a single member of the ECC group. A memory operation can be received and executed using the ECC groups.

30 Claims, 7 Drawing Sheets

| ROW | BANK 0,8 | BANK 1,9 | BANK 2,A | BANK 3,B | BANK 4,C | BANK 5,D | BANK 6,E | BANK 7,F |
|---|---|---|---|---|---|---|---|---|
| 0 | DATA_0 | DATA_1 | DATA_2 | DATA_3 | DATA_4 | DATA_5 | DATA_6 | ECC |
| 1 | DATA_1 | DATA_2 | DATA_3 | DATA_4 | DATA_5 | DATA_6 | ECC | DATA_0 |
| 2 | DATA_2 | DATA_3 | DATA_4 | DATA_5 | DATA_6 | ECC | DATA_0 | DATA_1 |
| 3 | DATA_3 | DATA_4 | DATA_5 | DATA_6 | ECC | DATA_0 | DATA_1 | DATA_2 |
| 4 | DATA_4 | DATA_5 | DATA_6 | ECC | DATA_0 | DATA_1 | DATA_2 | DATA_3 |
| 5 | DATA_5 | DATA_6 | ECC | DATA_0 | DATA_1 | DATA_2 | DATA_3 | DATA_4 |
| 6 | DATA_6 | ECC | DATA_0 | DATA_1 | DATA_2 | DATA_3 | DATA_4 | DATA_5 |
| 7 | ECC | DATA_0 | DATA_1 | DATA_2 | DATA_3 | DATA_4 | DATA_5 | DATA_6 |

| BH | COLUMN | BL | Q | MC | ROW |

— 500

— 505

| FIELD | NAME | BITS | ADDRESS BITS | | |
|---|---|---|---|---|---|
| | | | 8 KB LINE | 4 KB LINE | 2 KB LINE |
| Q | QUAD | 2 | 14:13 | 13:12 | 12:11 |
| ROW | ROW | 15 | 30:16 | 30:16 | 30:16 |
| COLUMN | COLUMN | 11 | 10:0 | 10:0 | 10:0 |
| BH | MS BANK | 1 | 15 | 15 | 15 |
| BL | LS BANK | 3 | 33:31 ^ 18:16 | 33:31 ^ 18:16 | 33:31 ^ 18:16 |
| MC | MEMORY CONTROLER | 2 | 12:11 | 14:11 | 14:13 |

FIG. 5

MEMORY CONTROLLER IMPLEMENTED ERROR CORRECTION CODE MEMORY

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Error correction code (ECC) RAM uses additional bits to address bit errors in RAM due to, for example, cosmic background radiation or other electrical or magnetic interference. A variety of error correction techniques can be used to realize ECC RAM, such as using parity bits or error correction codes (e.g., Hamming codes).

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 3 illustrates an example of striping ECC data across banks and rows in a DRAM integrated circuit, according to an embodiment.

FIG. 5 illustrates an example of a memory address to access ECC groups, according to an embodiment.

DETAILED DESCRIPTION

Figure 1:
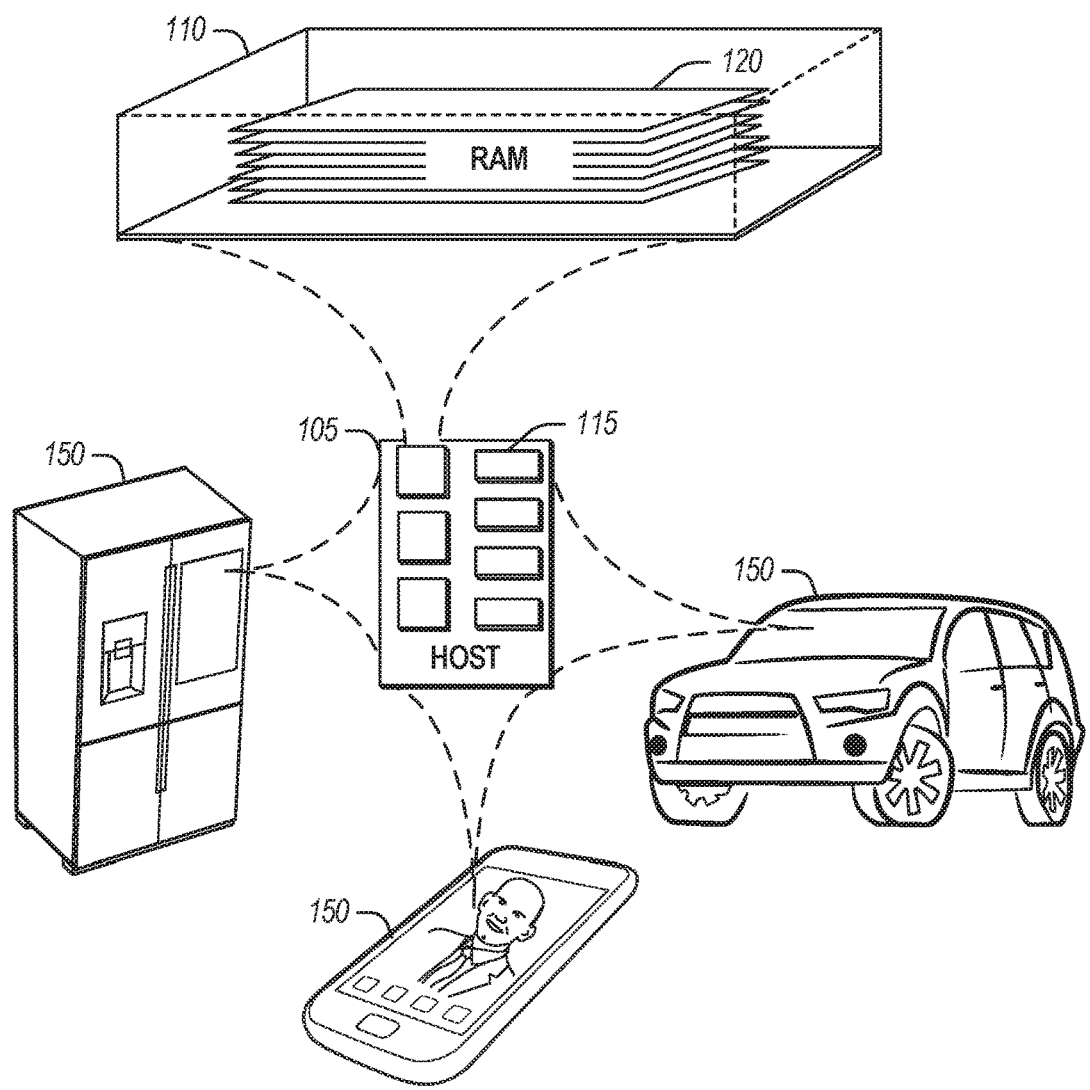
FIG. 1 illustrates an example of an environment including a system for RAM power savings, according to an embodiment.

Volatile memory devices are often integral to system operations. Generally, they are byte addressable and thus directly accessible from processors, unlike storage devices that are addressable in pages, blocks, etc. Volatile memories like SRAM and DRAM are also fast enough to satisfy user expectations for device performance. As noted above, however, a variety of electrical or magnetic interference can cause a bit to flip in DRAM. This corruption can cause a number of problems. To address these issues, ECC techniques are used generally to correct single bit errors or detect errors in two or more bits. ECC DRAM generally uses extra DRAM die or integrated circuits (IC) to hold the additional information that allows ECC to work. Thus, ECC DRAM generally has, for example, four DRAM ICs for data and an additional DRAM IC for ECC data.

Some memory devices, such as high-speed DRAM (e.g., GDDR6), do not have extra space in the package to include an additional DRAM IC for error detection or correction without losing a fourth of its storage capacity that results from designating one out of every four DRAM ICs for ECC data. Another, issue that tends to discourage ECC-specific DRAM ICs involves the burst length and interface width of GDDR6, or like, to provide all the data to service a request from just one device. Using four devices in parallel would provide four-times the data needed for a request and therefore be very inefficient from a bandwidth and power perspective. Generally, when using GDDR6, each memory channel is attached to only one device. This allows four-times the memory operations per second, which is an important metric for some systems and applications.

To address these issue, a novel ECC data placement technique is employed that distributes ECC data across DRAM IC rows and banks to avoid hotspots while also allowing efficient access to ECC data that corresponds to user data. This technique of designating or assigning certain portions of a DRAM array to serve as ECC DRAM is referred to as ECC striping. The technique enables seven-eighths of DRAM capacity to be retained for user data while providing ECC storage without additional DRAM ICs than are present on non-ECC memories. Moreover, the ECC striping technique permits 8-byte granularity reads and writes without a large penalty, an eight-ninths bus utilization for most or all memory accesses, and an address space for user data that appears to be a contiguous region to accessors or host devices (e.g., central processing units (CPUs), graphics processing units (GPUs), etc.).

Although the examples herein refer to DRAM, these techniques are also applicable to other memory technologies that do not have dedicated ICs to handle ECC data and yet for which ECC protections are sought. Examples of these additional memories include storage class memory (e.g., crosspoint, 3D XPoint™), phase change memory (PCM), ferroelectric memory (FeRAM), magnetoresistive RAM (MRAM), NAND Flash, or other array memories. Additional details and examples are described below.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The host device 105 includes a memory controller 115 and the memory device 110 includes a memory array 120 including, for example, a number of individual memory chips, ranks, or banks. In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105. For many examples described below, the memory array is arranged in a package with four DRAM ICs on each side for a total of eight DRAM ICs. In these examples, each DRAM IC includes eight banks representing one hundred and twenty-eight megabytes (128 MB) of data. Thus, the package has two gigabytes (2 GB) of available data. Generally, a single operation, such as a read or write, can access one row from each bank from each DRAM IC at a time (e.g., multiple banks of a DRAM IC can be read in parallel, and multiple DRAM ICs can be read in parallel).

One or more communication interfaces can be used to transfer data between the memory device 110 and one or more other components of the host device 105. The host device 105 can include a host system, an electronic device, a processor, a memory card reader, or one or more other electronic devices external to the memory device 110. In some examples, the host 105 can be a machine having some portion, or all, of the components discussed in reference to the machine 700 of FIG. 7.

The memory controller 115 can receive instructions from the host 105, and can communicate with the memory array 120, such as to transfer data to (e.g., write or erase) or from (e.g., read) one or more of the chips, ranks, or banks of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. The memory controller 115 can include one or more input/output (I/O) circuits, lines, or interfaces to transfer data to or from the memory array 120.

The memory controller 115 can include, among other things, circuitry or firmware, such as a number of components or integrated circuits associated with various memory management functions, as de-fragmentation. The memory controller 115 can parse or format host commands (e.g., commands received from a host) into device commands (e.g., commands associated with operation of a memory array, etc.), or generate device commands (e.g., to accomplish various memory management functions) for the array 120 or one or more other components of the memory device 110.

The memory controller 115 can include, among other things, circuitry or components configured to control memory operations associated with writing data to, reading data from, or erasing one or more memory cells of the memory device 110. The memory operations can be based on, for example, host commands received from the host 105, or internally generated by the memory controller 115 (e.g., in association with defragmentation, error correction, refresh, etc.). The memory controller 115 may include code or logic to communicate using a standardized protocol (or features from a standardized protocol), such as GDDR6.

The memory controller 115 can include an error correction code (ECC) component, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources to prevent future errors.

ECC is implemented through use of ECC data. The ECC data may be of different forms depending upon the ECC technique employed. For example, the ECC data may include parity bits, various forms of Hamming code, etc. To efficiently store the ECC data, the memory controller 115 is arranged to designate or stripe ECC groups across banks of the memory device 110. Here, an ECC group is a collection of bytes equal to one row in one bank of a DRAM IC in the memory array. Thus, the ECC groups together represent the complete ECC data. To avoid a single bank becoming a hotspot (e.g., subject to significantly more operations than other banks), the ECC groups are striped (e.g., designated, interleaved, placed, etc.) such that a given bank has only a single member of the ECC group. Thus, the ECC data is separated across banks in a DRAM IC. In an example, an ECC group member is one eighth of the row capacity or two-hundred and fifty-six bytes which covers two-thousand and forty-eight bytes of data. This size allows one row of ECC to cover the other seven rows of data at the same row offset in the other banks in the device.

In an example, the memory controller 115 is arranged to stripe the ECC groups starting at a first row offset within a first bank and to increment the first row offset with each successive bank after the first bank in the DRAM IC. Thus, for example, the ECC group member for the first bank can occupy the first row of the first bank, the second row of the second bank, the third row of the third bank, etc. In an example, the increment subject to a modulus (or modulo) operation for all banks in the DRAM IC. Thus, if the ECC group member occupies the seventh row (e.g., row six when the indexing starts at zero), for the first bank, the increment places the ECC group in the eighth row in bank zero, and the ninth row in bank one (e.g., nine modulus eight equal one). In an example, the increments are implemented by exclusive-ORing (e.g., XOR) the three most significant address bits for the DRAM with the three least significant row address bits, which are a portion of the address bits.

In an example, a member of the ECC group is unused. This can occur because the entirety of a row across all banks on a DRAM IC are not needed to contain the ECC data (one row provides eight groups of ECC information, but there are only seven data groups at a given row offset). In an example, the member of the ECC group that is unused is determined by using (e.g., switching) the three most significant address bits of the DRAM as the three least significant bank address bits. Here, the address of an ECC group member that corresponds to the requested memory is determined by this bit swap in the address.

In an example, the memory controller 115 is arranged to stripe a set of data groups across the banks. A data group is non-ECC data, such as user data. A member in the set of data groups can have as many data groups as the ECC data groups. In an example, similar to ECC groups, the set of data groups are striped such that a given bank has a single data group from the data groups of a member from the set of data groups. Thus, in such cases, no bank has more than one data group of any given member in the set of data groups. In an example, each data group occupies an entire row in a bank.

The memory controller 115 is arranged to receive a memory operation, such as a read or a write, and execute the memory operation using the ECC groups. Here, the ECC groups are used to perform some form of ECC computation (e.g., on a read) or update (e.g., on a write) to provide ECC DRAM without dedicated DRAM ICs. In an example, to complete a memory operation with ECC (e.g., using the ECC group), the memory controller 115 is arranged to retrieve an ECC group member that is at a same row offset as a data group member subject to the memory operation. Thus, access to a data group member at the fourth row of a bank will involve access of the fourth row of another bank to retrieve the corresponding ECC data. The memory controller 115 can then perform an ECC operation using the ECC group member. In an example, to retrieve the ECC group member that is at the same row offset as the data group member, the memory controller 115 is arranged to XOR a portion of an address for the data group member with a fixed value. In an example, the fixed value is 0xF.

The ECC striping technique (i.e., the technique of designating certain portions of a bank for ECC data in a manner that limits the burden on user data) enables a contiguous address space to be presented to other components on the device 105. Eight-byte granularity can be implemented in the ECC codes to allow flexibility in data accesses while maintaining access efficiency. Further, little space is consumed for ECC group while still enabling a full row (e.g., across banks) to be accessed along with the corresponding ECC group. Thus, an activate command to activate a full row inside the DRAM IC activates a data row in a first bank and an ECC row in a second bank. All of the data in the data row and the ECC group in the ECC row is used for large block access (e.g., an entire DRAM row).

A two hundred and fifty-six byte (256B) data group member allows a device with a thirty-two byte (32B) burst efficient access to the ECC data. In a device with a different burst size, such as a sixteen byte (16B) burst, an data group member size of one hundred and twenty-eight bytes (128B) can be used.

The bank-based ECC striping described herein enables error correction codes to be used on a memory subsystem that does not have space to add additional DRAM ICs. It does this with the minimum of cost in bandwidth and memory capacity while optimizing for DRAM energy with large (e.g., whole row) data accesses.

Figure 2:
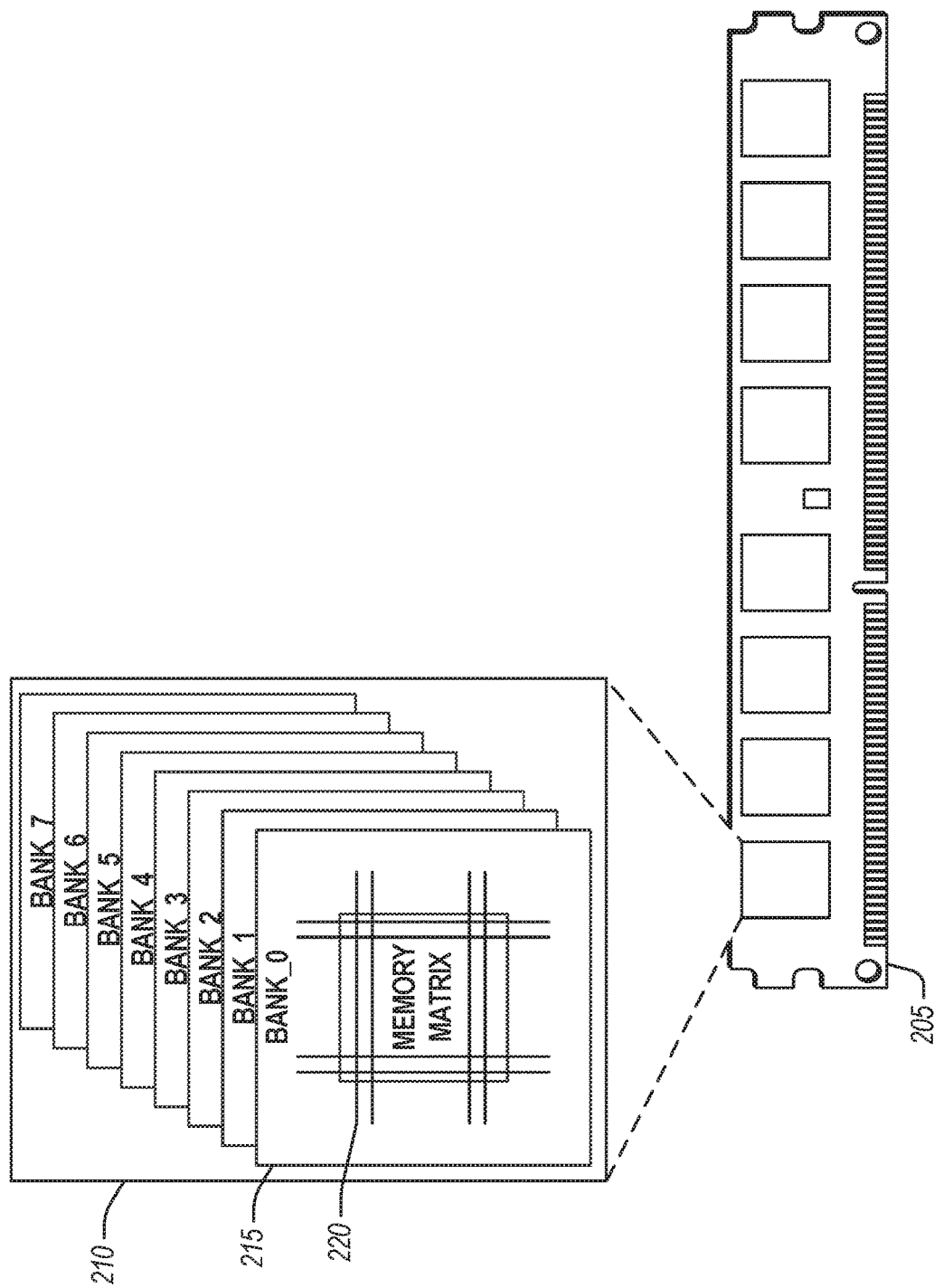
FIG. 2. illustrates an example of a DRAM package, according to an embodiment.

FIG. 2. illustrates an example of a DRAM package 205 (e.g., dual in-line memory module (DIMM)), according to an embodiment. The DRAM package includes four ICs per side for a total of eight ICs. Each IC, such as IC 210, has eight banks (indexed from zero). As illustrated in Bank_0 215, each bank includes a memory matrix with rows 220 and columns. Each IC represents one hundred and twenty-eight megabytes (128 MB) for a total of two gigabytes (2 GB) for the package 205. The DRAM package 205 illustrated differs from traditional ECC DRAM packages because it does not include an additional DRAM IC to hold the ECC data. Thus, the DRAM package 205 is one that benefits from the ECC striping technique described herein.

FIG. 3 illustrates an example of striping ECC data across eight banks and eight rows in a DRAM IC, according to an embodiment. In this example of bank-based ECC striping, each row in a single bank is either all data or all ECC. The rows designated or assigned for ECC data are thus striped (i.e., create a striped pattern) over the banks when considered or viewed as depicted in FIG. 3. For any given group of eight rows, seven rows are data rows (e.g., non-ECC data) and one row is an ECC row. To prevent one out of every eight banks becoming a hotspot, the ECC rows are diagonally striped across the eight banks as shown. Also, as illustrated, the data is diagonally striped across banks and rows. These eight banks can either be in a single DRAM IC or in any DRAM IC in the DRAM package.

Figure 4:
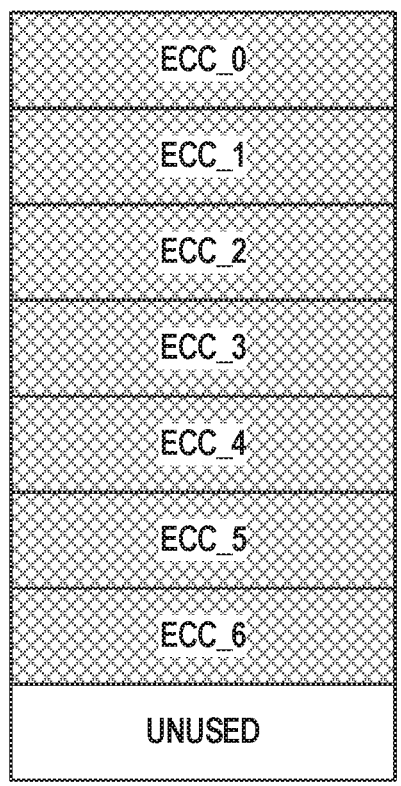
FIG. 4 illustrates an example of ECC group to bank and row mapping, according to an embodiment.
Figure 4:
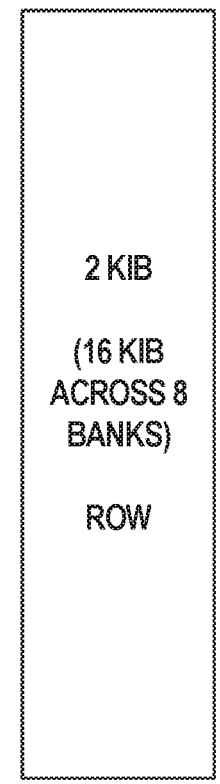

FIG. 4 illustrates an example of ECC group to bank and row mapping, according to an embodiment. As illustrated, the ECC row is divided into eight, two hundred and fifty-six byte (256B) groups of which the last is unused. Each of the ECC groups are mapped to the seven banks of data at the same row offset, according to the example shown in FIG. 4.

FIG. 5 illustrates an example of a memory address 500 to access ECC groups, according to an embodiment. The illustrated address can be used by a memory accessor and presented to a memory controller to address user data (e.g., non ECC data). With additional bits for additional memory controllers in a quad, data, including ECC data, can be interleaved across all banks in all DRAM ICs attached to the quad. This can be accomplished by mapping the address 500 bits as illustrated in the table 505.

In a fourteen gigabyte (14 GB) system (e.g., eight, two-gigabyte GDDR6 packages with stripped ECC data), addresses with the most significant three bits (e.g., 33:31) set to one may not be supported. Those three address bits can be therefore used as the least significant three bank bits such that one out of every eight rows in a bank are not used for data. To generate the diagonal stripe of ECC groups as described above, address bits 33 through 31 are XOR-ed with the three least significant row address bits (e.g., 18 through 16). To access the ECC data at a particular row offset a value of 0x7 is XOR-ed with address bits 18 through 16.

Given the addressing based ECC striping described above, and an eight kilobyte (8 kB) cache line, four rows of data will fill the entire cache line. Thus, in such examples, every data bit that is activated is used. Another four rows, in different banks, can be also activated to provide the ECC data. With good cache behavior, half of the total bits activated are used, in such cases.

Figure 6:
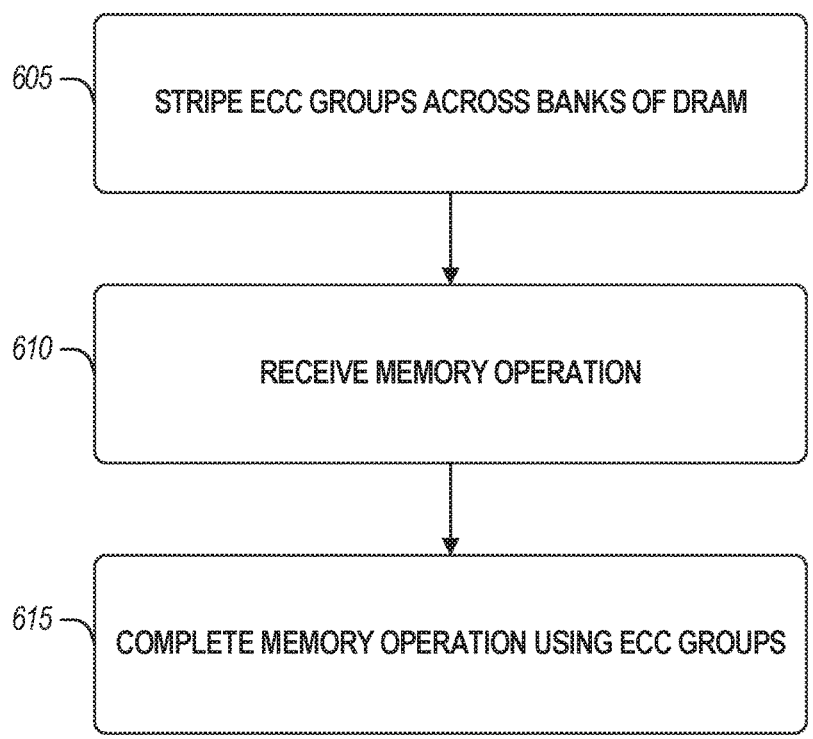
FIG. 6 illustrates an example flowchart of a method for memory controller implemented ECC DRAM, according to an embodiment.

FIG. 6 illustrates an example flowchart of a method 600 for memory controller implemented ECC DRAM, according to an embodiment. The operations of the method may be performed, for example, by the memory controller 115 illustrated in FIG. 1 or the processor 702 and the machine readable medium 722 illustrated in FIG. 7.

At operation 605, ECC groups are striped across banks of the DRAM. Here, an ECC group member is a collection of bytes equal to one row in one bank. In an example, the striping a given bank to a single member of the ECC group. In an example, an ECC group member is two-hundred and fifty-six bytes (56B).

In an example, striping the ECC groups starts at a first row offset within a first bank and increments the first row offset with each successive bank after the first bank. In an example, the increment is subject to a modulus operation for all banks in the DRAM. In an example, the increments are implemented by XOR-ing the three most significant address bits for the DRAM with the three least significant row address bits. Here, the row address bits are a portion of the address bits.

In an example, a member of the ECC group is unused. In an example, the member of the ECC group that is unused is determined by using three most significant address bits of the DRAM as three least significant bank address bits.

In an example, a set of data groups can also be striped across the banks. In an example, set of data groups are striped such that a single member of each data group from the set of data groups is placed within a given bank.

At operation 610, a memory operation is received. At operation 615, the memory operation is completed using the ECC groups. In an example, completing the memory operation using the ECC groups includes retrieving an ECC group member that is at a same row offset as a data group member subject to the memory operation. An ECC operation can then be performed using the ECC group member. In an example, retrieving the ECC group member that is at the same row offset as the data group member includes XOR-ing a portion of an address for the data group member with a fixed value.

In an example, the DRAM includes DRAM ICs and none of the several DRAM ICs are exclusively ECC. In an example, each DRAM IC includes a set of banks, each bank including rows. In an example, striping the ECC groups across banks of the DRAM includes allocating one ECC group member to each bank in each DRAM IC in the DRAM ICs.

Figure 7:
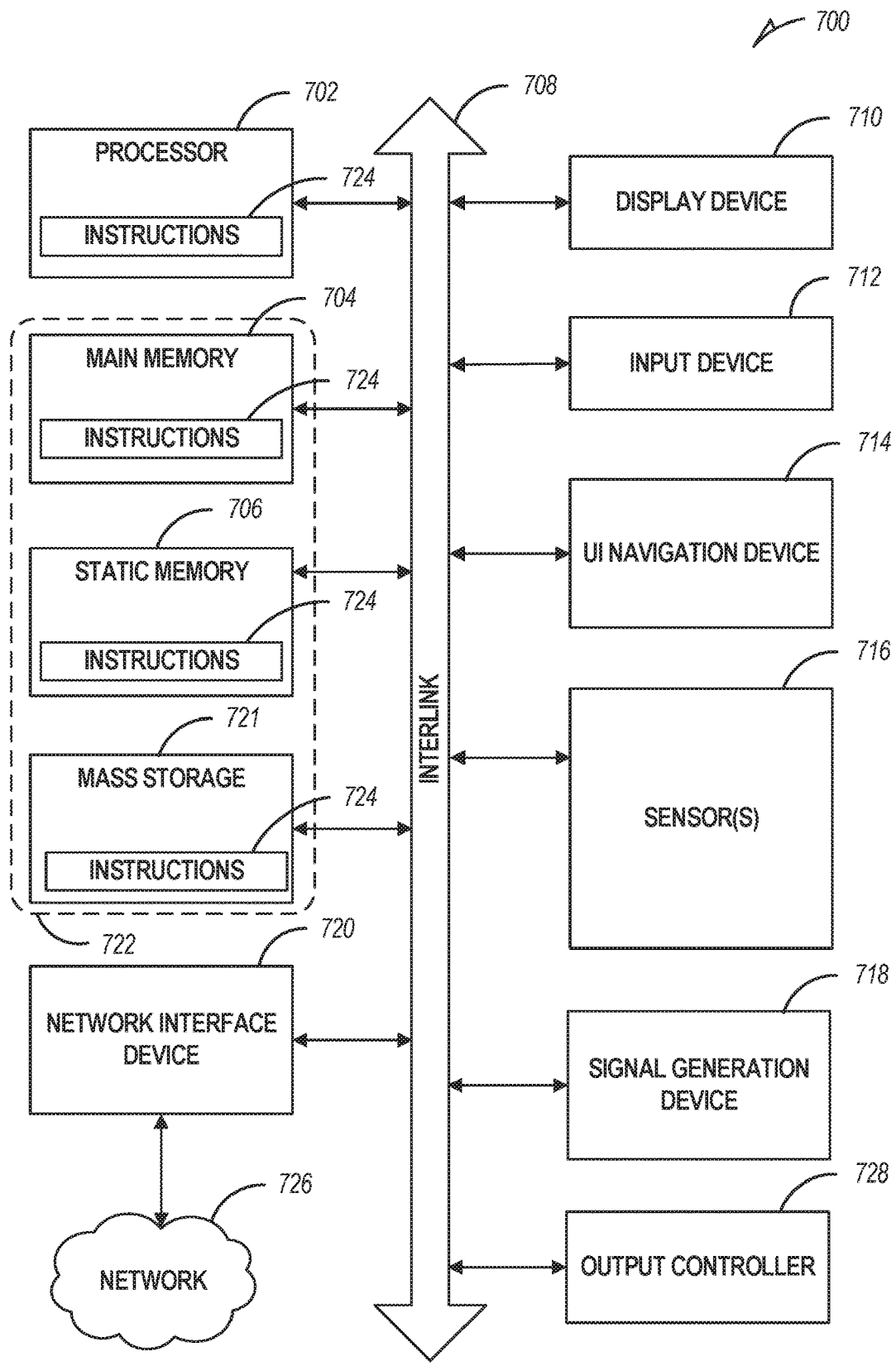
FIG. 7 is a block diagram illustrating an example of a machine upon which one or more embodiments can be implemented.

FIG. 7 illustrates a block diagram of an example machine 700 upon which any one or more of the techniques (e.g., methodologies) discussed herein can perform. In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment.

The machine 700 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired).

In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating.

In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 700 (e.g., the host device 105, the memory device 110, etc.) can include a hardware processor 702 (e.g., a central processing unit (CPU), a graphics processing unit (GPU), a hardware processor core, or any combination thereof, such as the memory controller 115, etc.), a main memory 704 and a static memory 706, some or all of which can communicate with each other via an interlink (e.g., bus) 708. The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The machine 700 can additionally include a storage device (e.g., drive unit) 716, a signal generation device 718 (e.g., a speaker), a network interface device 720, and one or more sensors 716, such as a global positioning system (GPS) sensor, compass, accelerometer, or other sensor.

The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The machine 700 can include a machine readable medium 722 on which is stored one or more sets of data structures or instructions 724 (e.g., software) embodying or utilized by any one or more of the techniques or functions described herein. The instructions 724 can also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 can constitute the machine readable medium 722.

While the machine readable medium 722 is illustrated as a single medium, the term "machine readable medium" can include a single medium or multiple media (e.g., a centralized or distributed database, or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 (e.g., software, programs, an operating system (OS), etc.) or other data are stored on the storage device 721, can be accessed by the memory 704 for use by the processor 702. The memory 704 (e.g., DRAM) is typically fast, but volatile, and thus a different type of storage than the storage device 721 (e.g., an SSD), which is suitable for long-term storage, including while in an "off" condition. The instructions 724 or data in use by a user or the machine 700 are typically loaded in the memory 704 for use by the processor 702. When the memory 704 is full, virtual space from the storage device 721 can be allocated to supplement the memory 704; however, because the storage 721 device is typically slower than the memory 704, and write speeds are typically at least twice as slow as read speeds, use of virtual memory can greatly reduce user experience due to storage device latency (in contrast to the memory 704, e.g., DRAM). Further, use of the storage device 721 for virtual memory can greatly reduce the usable lifespan of the storage device 721.

In contrast to virtual memory, virtual memory compression (e.g., the Linux® kernel feature "ZRAM") uses part of the memory as compressed block storage to avoid paging to the storage device 721. Paging takes place in the compressed block until it is necessary to write such data to the storage device 721. Virtual memory compression increases the usable size of memory 704, while reducing wear on the storage device 721.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 724 can further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, 3GPP family of standards known as LTE, LTE-A, LTE-PRO, or NR), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL EXAMPLES

Example 1 is a memory device for error correction code (ECC) memory, the memory device comprising: a memory array; and a memory controller to: stripe ECC groups across banks of the memory array, an ECC group being a collection of bytes equal to one row in one bank, wherein the ECC groups stripe restricts a given bank to a single member of the ECC group; receive a memory operation; and complete the memory operation using the ECC groups.

In Example 2, the subject matter of Example 1 is modified such that the memory device is a dynamic random access (DRAM) memory.

In Example 3, the subject matter of Example 2 is modified such that the banks reside on a single DRAM integrated circuit (IC) of the memory array.

In Example 4, the subject matter of Examples 2-3 is modified such that the banks reside on several DRAM integrated circuits (ICs) on a dual in-line memory module (DIMM) of the memory array.

In Example 5, the subject matter of Examples 1-4 is modified such that an ECC group is one-eighth of a row width.

In Example 6, the subject matter of Example 5 is modified such that the ECC group is two-hundred and fifty-six bytes.

In Example 7, the subject matter of Examples 1-6 is modified such that, to stripe the ECC groups, the memory controller starts at a first row offset within a first bank and increments the first row offset with each successive bank after the first bank, the increment subject to a modulus operation for all banks in the memory.

In Example 8, the subject matter of Example 7 is modified such that the increments are implemented by an exclusive-OR of three most significant address bits for the memory with three least significant row address bits, the row address bits being a portion of the address bits.

In Example 9, the subject matter of Examples 7-8 is modified such that an ECC group of the ECC groups is unused.

In Example 10, the subject matter of Example 9 is modified such that the ECC group that is unused is determined by a replacement of three most significant address bits of the memory with three least significant bank address bits.

In Example 11, the subject matter of Examples 7-10 is modified such that the memory controller is to stripe a set of data groups across the banks, wherein the stripe of the set of data groups restricts the given bank to a single data group from a member of the set of data groups.

In Example 12, the subject matter of Example 11 is modified such that, to complete the memory operation using the ECC groups, the memory controller is to: retrieve an ECC group that is at a same row offset as a data group subject to the memory operation; and perform an ECC operation using the ECC group.

In Example 13, the subject matter of Example 12 is modified such that, to retrieve the ECC group that is at the same row offset as the data group, the memory controller is to exclusive-OR a portion of an address for the data group with a fixed value.

In Example 14, the subject matter of Examples 1-13 is modified such that the memory array includes several memory integrated circuits (ICs) and none of the several memory ICs are exclusively ECC.

In Example 15, the subject matter of Example 14 is modified such that each memory IC includes a set of banks, each bank including rows.

In Example 16, the subject matter of Example 15 is modified such that, to stripe the ECC groups across banks of the memory, the memory controller is to allocate one ECC group to each bank in each memory IC in the several memory ICs.

Example 17 is a method for memory controller implemented error correction code (ECC) memory, the method comprising: striping ECC groups across banks of the memory, an ECC group being a collection of bytes equal to one row in one bank, wherein striping the ECC groups restricts a given bank to a single member of the ECC group; receiving a memory operation; and completing the memory operation using the ECC groups.

In Example 18, the subject matter of Example 17 is modified such that the memory is a dynamic random access (DRAM) memory.

In Example 19, the subject matter of Example 18 is modified such that the banks reside on a single DRAM integrated circuit (IC).

In Example 20, the subject matter of Examples 18-19 is modified such that the banks reside on several DRAM integrated circuits (ICs) on a dual in-line memory module (DIMM).

In Example 21, the subject matter of Examples 17-20 is modified such that an ECC group is one-eighth of a row width.

In Example 22, the subject matter of Example 21 is modified such that the ECC group is two-hundred and fifty-six bytes.

In Example 23, the subject matter of Examples 17-22 is modified such that striping the ECC groups starts at a first row offset within a first bank and increments the first row offset with each successive bank after the first bank, the increment subject to a modulus operation for all banks in the memory.

In Example 24, the subject matter of Example 23 is modified such that the increments are implemented by exclusive-ORing three most significant address bits for the memory with three least significant row address bits, the row address bits being a portion of the address bits.

In Example 25, the subject matter of Examples 23-24 is modified such that an ECC group of the ECC groups is unused.

In Example 26, the subject matter of Example 25 is modified such that the ECC group that is unused is determined by using three most significant address bits of the memory as three least significant bank address bits.

In Example 27, the subject matter of Examples 23-26 includes, striping a set of data groups across the banks, wherein the striping the set of data groups restricts the given bank to a single data group from a member of the set of data groups.

In Example 28, the subject matter of Example 27 is modified such that completing the memory operation using the ECC groups includes: retrieving an ECC group that is at a same row offset as a data group subject to the memory operation; and performing an ECC operation using the ECC group.

In Example 29, the subject matter of Example 28 is modified such that retrieving the ECC group that is at the same row offset as the data group includes exclusive-ORing a portion of an address for the data group with a fixed value.

In Example 30, the subject matter of Examples 17-29 is modified such that the memory includes several memory integrated circuits (ICs) and none of the several memory ICs are exclusively ECC.

In Example 31, the subject matter of Example 30 is modified such that each memory IC includes a set of banks, each bank including rows.

In Example 32, the subject matter of Example 31 is modified such that striping the ECC groups across banks of the memory includes allocating one ECC group to each bank in each memory IC in the several memory ICs.

Example 33 is a machine readable medium including instructions for memory controller implemented error correction code (ECC) memory, the instructions, when executed by a machine, cause the machine to perform operations comprising: striping ECC groups across banks of the memory, an ECC group being a collection of bytes equal to one row in one bank, wherein striping the ECC groups restricts a given bank to a single member of the ECC group; receiving a memory operation; and completing the memory operation using the ECC groups.

In Example 34, the subject matter of Example 33 is modified such that the memory is a dynamic random access (DRAM) memory.

In Example 35, the subject matter of Example 34 is modified such that the banks reside on a single DRAM integrated circuit (IC).

In Example 36, the subject matter of Examples 34-35 is modified such that the banks reside on several DRAM integrated circuits (ICs) on a dual in-line memory module (DIMM).

In Example 37, the subject matter of Examples 33-36 is modified such that an ECC group is one-eighth of a row width.

In Example 38, the subject matter of Example 37 is modified such that the ECC group is two-hundred and fifty-six bytes.

In Example 39, the subject matter of Examples 33-38 is modified such that striping the ECC groups starts at a first row offset within a first bank and increments the first row offset with each successive bank after the first bank, the increment subject to a modulus operation for all banks in the memory.

In Example 40, the subject matter of Example 39 is modified such that the increments are implemented by exclusive-ORing three most significant address bits for the memory with three least significant row address bits, the row address bits being a portion of the address bits.

In Example 41, the subject matter of Examples 39-40 is modified such that an ECC group of the ECC groups is unused.

In Example 42, the subject matter of Example 41 is modified such that the ECC group that is unused is determined by using three most significant address bits of the memory as three least significant bank address bits.

In Example 43, the subject matter of Examples 39-42 is modified such that the operations comprise striping a set of data groups across the banks, wherein the striping the set of data groups restricts the given bank to a single data group from a member of the set of data groups.

In Example 44, the subject matter of Example 43 is modified such that completing the memory operation using the ECC groups includes: retrieving an ECC group that is at a same row offset as a data group subject to the memory operation; and performing an ECC operation using the ECC group.

In Example 45, the subject matter of Example 44 is modified such that retrieving the ECC group that is at the same row offset as the data group includes exclusive-ORing a portion of an address for the data group with a fixed value.

In Example 46, the subject matter of Examples 33-45 is modified such that the memory includes several memory integrated circuits (ICs) and none of the several memory ICs are exclusively ECC.

In Example 47, the subject matter of Example 46 is modified such that each memory IC includes a set of banks, each bank including rows.

In Example 48, the subject matter of Example 47 is modified such that striping the ECC groups across banks of the memory includes allocating one ECC group to each bank in each memory IC in the several memory ICs.

Example 49 is a system for memory controller implemented error correction code (ECC) memory, the system comprising: means for striping ECC groups across banks of the memory, an ECC group being a collection of bytes equal to one row in one bank, wherein striping the ECC groups restricts a given bank to a single member of the ECC group; means for receiving a memory operation; and means for completing the memory operation using the ECC groups.

In Example 50, the subject matter of Example 49 is modified such that the memory is a dynamic random access (DRAM) memory.

In Example 51, the subject matter of Example 50 is modified such that the banks reside on a single DRAM integrated circuit (IC).

In Example 52, the subject matter of Examples 50-51 is modified such that the banks reside on several DRAM integrated circuits (ICs) on a dual in-line memory module (DIMM).

In Example 53, the subject matter of Examples 49-52 is modified such that an ECC group is one-eighth of a row width.

In Example 54, the subject matter of Example 53 is modified such that the ECC group is two-hundred and fifty-six bytes.

In Example 55, the subject matter of Examples 49-54 is modified such that striping the ECC groups starts at a first row offset within a first bank and increments the first row offset with each successive bank after the first bank, the increment subject to a modulus operation for all banks in the memory.

In Example 56, the subject matter of Example 55 is modified such that the increments are implemented by exclusive-ORing three most significant address bits for the memory with three least significant row address bits, the row address bits being a portion of the address bits.

In Example 57, the subject matter of Examples 55-56 is modified such that an ECC group of the ECC groups is unused.

In Example 58, the subject matter of Example 57 is modified such that the ECC group that is unused is determined by using three most significant address bits of the memory as three least significant bank address bits.

In Example 59, the subject matter of Examples 55-58 includes, means for striping a set of data groups across the banks, wherein the striping the set of data groups restricts the given bank to a single data group from a member of the set of data groups.

In Example 60, the subject matter of Example 59 is modified such that the means for completing the memory operation using the ECC groups include: means for retrieving an ECC group that is at a same row offset as a data group subject to the memory operation; and means for performing an ECC operation using the ECC group.

In Example 61, the subject matter of Example 60 is modified such that the means for retrieving the ECC group that is at the same row offset as the data group include means for exclusive-ORing a portion of an address for the data group with a fixed value.

In Example 62, the subject matter of Examples 49-61 is modified such that the memory includes several memory integrated circuits (ICs) and none of the several memory ICs are exclusively ECC.

In Example 63, the subject matter of Example 62 is modified such that each memory IC includes a set of banks, each bank including rows.

In Example 64, the subject matter of Example 63 is modified such that the means for striping the ECC groups across banks of the memory include means for allocating one ECC group to each bank in each memory IC in the several memory ICs.

Example 65 is at least one machine-readable medium including instructions that, when executed by processing circuitry, cause the processing circuitry to perform operations to implement of any of Examples 1-64.

Example 66 is an apparatus comprising means to implement of any of Examples 1-64.

Example 67 is a system to implement of any of Examples 1-64.

Example 68 is a method to implement of any of Examples 1-64.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time.

The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.).

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to," or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory device for error correction code (ECC) memory, the memory device comprising:
   a memory array; and
   a memory controller to:
      designate ECC groups across banks of the memory array, any given ECC group being a collection of bytes equal to one row in one bank, wherein the ECC groups designation restricts a given bank to a single member of the ECC groups, wherein, to designate the ECC groups, the memory controller starts at a first row offset within a first bank and increments the first row offset with each successive bank after the first bank, wherein an increment is subject to a modulus operation for all banks in the memory array;
      receive a memory operation; and
      execute the memory operation using the ECC groups.

2. The memory device of claim 1, wherein the memory device comprises a dynamic random access (DRAM) memory.

3. The memory device of claim 2, wherein the banks reside on:
   a single DRAM integrated circuit (IC) of the memory array; or
   several DRAM integrated circuits (ICs) on a dual in-line memory module (DIMM) of the memory array.

4. The memory device of claim 1, wherein an ECC group is one-eighth of a row width.

5. The memory device of claim 1, wherein the increments are implemented by an exclusive-OR of:
   three most significant bits of an address for the memory array; with
   three least significant row bits of the address.

6. The memory device of claim 1, wherein one ECC group of the ECC groups is unused.

7. The memory device of claim 6, wherein the one ECC group that is unused is determined by a replacement of three most significant bits of an address for the memory array with three least significant bank bits of the address.

8. The memory device of claim 1, wherein the memory controller is to designate a set of data groups across the banks, wherein the designation of the set of data groups restricts the given bank to a single data group from a member of the set of data groups.

9. The memory device of claim 8, wherein, to execute the memory operation using the ECC groups, the memory controller is to:
   retrieve an ECC group, from the ECC groups, that is at a same row offset as a data group subject to the memory operation; and
   perform an ECC operation using the retrieved ECC group that is at the same row offset as the data group.

10. The memory device of claim 1, wherein the memory array includes several memory integrated circuits (ICs) and none of the several memory ICs are exclusively ECC.

11. A method for memory controller implemented error correction code (ECC) memory, the method comprising:
   designating ECC groups across banks of a memory array, any given ECC group being a collection of bytes equal to one row in one bank, wherein the ECC groups designation restricts a given bank to a single member of the ECC groups, wherein, designating the ECC groups starts at a first row offset within a first bank and increments the first row offset with each successive bank after the first bank, wherein an increment is subject to a modulus operation for all banks in the memory array;
   receiving a memory operation; and
   executing the memory operation using the ECC groups.

12. The method of claim 11, wherein the memory operation comprises a dynamic random access (DRAM) memory access.

13. The method of claim 12, wherein the banks reside on:
   a single DRAM integrated circuit (IC) of the memory array; or
   several DRAM integrated circuits (ICs) on a dual in-line memory module (DIMM) of the memory array.

14. The method of claim 11, wherein an ECC group is one-eighth of a row width.

15. The method of claim 11, wherein the increments are implemented by exclusive-ORing:
   three most significant bits of an address for the memory array; with
   three least significant row bits of the address.

16. The method of claim 11, wherein one ECC group of the ECC groups is unused.

17. The method of claim 16, wherein the one ECC group that is unused is determined by using three most significant bits of an address for the memory array as three least significant bank bits of the address.

18. The method of claim 11, comprising designating a set of data groups across the banks, wherein designating the set of data groups restricts the given bank to a single data group from a member of the set of data groups.

19. The method of claim 18, wherein executing the memory operation using the ECC groups includes:
   retrieving an ECC group, from the ECC groups, that is at a same row offset as a data group subject to the memory operation; and
   performing an ECC operation using the retrieved ECC group that is at the same row offset as the data group.

20. The method of claim 11, wherein the memory array includes several memory integrated circuits (ICs) and none of the several memory ICs are exclusively ECC.

21. A non-transitory machine readable medium including instructions for memory controller implemented error correction code (ECC) memory, the instructions, when executed by a machine, cause the machine to perform operations comprising:
   designating ECC groups across banks of a memory array, any given ECC group being a collection of bytes equal to one row in one bank, wherein the ECC groups designation restricts a given bank to a single member of the ECC groups, wherein, designating the ECC groups starts at a first row offset within a first bank and increments the first row offset with each successive bank after the first bank, wherein an increment is subject to a modulus operation for all banks in the memory array;
   receiving a memory operation; and
   executing the memory operation using the ECC groups.

22. The non-transitory machine readable medium of claim 21, wherein the memory operation comprises a dynamic random access (DRAM) memory access.

23. The non-transitory machine readable medium of claim 22, wherein the banks reside on:
   a single DRAM integrated circuit (IC) of the memory array; or several DRAM integrated circuits (ICs) on a dual in-line memory module (DIMM) of the memory array.

24. The non-transitory machine readable medium of claim 21, wherein an ECC group is one-eighth of a row width.

25. The non-transitory machine readable medium of claim 21, wherein the increments are implemented by exclusive-ORing:
   three most significant bits of an address for the memory array; with three least significant row bits of the address.

26. The non-transitory machine readable medium of claim 21, wherein one ECC group of the ECC groups is unused.

27. The non-transitory machine readable medium of claim 26, wherein the one ECC group that is unused is determined by using three most significant bits of an address for the memory array as three least significant bank bits of the address.

28. The non-transitory machine readable medium of claim 21, wherein the operations comprise designating a set of data groups across the banks, wherein designating the set of data groups restricts the given bank to a single data group from a member of the set of data groups.

29. The non-transitory machine readable medium of claim 28, wherein executing the memory operation using the ECC groups includes:
   retrieving an ECC group, from the ECC groups, that is at a same row offset as a data group subject to the memory operation; and
   performing an ECC operation using the retrieved ECC group that is at the same row offset as the data group.

30. The non-transitory machine readable medium of claim 21, wherein the memory array includes several memory integrated circuits (ICs) and none of the several memory ICs are exclusively ECC.

* * * * *